US007176792B2

(12) United States Patent
Pereira et al.

(10) Patent No.: US 7,176,792 B2
(45) Date of Patent: Feb. 13, 2007

(54) METHOD AND APPARATUS FOR IDENTIFYING FAULTS IN A NETWORK THAT HAS GENERATED A PLURALITY OF FAULT ALARMS

(75) Inventors: Goncalo Pereira, Amadora (PT); Marco Soeima, Lisbon (PT)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 10/953,412

(22) Filed: Sep. 29, 2004

(65) Prior Publication Data

US 2005/0146426 A1    Jul. 7, 2005

(30) Foreign Application Priority Data

Sep. 30, 2003   (GB)   ................... 0322846.7

(51) Int. Cl.
  *G08B 29/00* (2006.01)
  *G05B 15/00* (2006.01)
(52) U.S. Cl. ................ 340/506; 340/521; 340/525; 340/522; 700/9; 700/17; 700/79; 700/83
(58) Field of Classification Search ............... 340/506
  See application file for complete search history.

(56) References Cited

U.S. PATENT DOCUMENTS 4,977,390 A    12/1990   Saylor et al. ............... 340/521
5,189,674 A    2/1993    Shimizu ..................... 714/712
5,528,516 A    6/1996    Yemini et al. ............... 702/119
5,946,373 A    8/1999    Harris ........................ 340/3.1
6,104,963 A *  8/2000    Cebasek et al. ............. 700/86
6,414,595 B1   7/2002    Scrandis et al. ............ 340/506
6,421,571 B1 * 7/2002    Spriggs et al. .............. 700/17

FOREIGN PATENT DOCUMENTS

WO    WO 01/77828 A2    10/2001
WO    WO 02/33980 A2    4/2002

* cited by examiner

*Primary Examiner*—Donnie L. Crosland

(57) ABSTRACT

In one aspect, a method for identifying faults in a network that has generated a plurality of fault alarms is provided. A plurality of object/alarm pairs are generated and an identification vector is assigned to each pair. The pairs are processed based on a set of rules to generate for each pair an alarm propagation vector that identifies that pair together with any other pairs from the plurality of pairs. The alarm propagation vectors are processed to determine which pairs have alarm propagation vectors that are not sub vectors of any of the alarm propagation vectors of the other pairs. Any pairs thus determined are identified as being linked to potential root causes of network problems.

13 Claims, 5 Drawing Sheets

| Object/Alarm Pair | ID |
|---|---|
| NE A<br>IntHWFail | 0 |
| Card A<br>CardDisabled | 1 |
| PB#1<br>LOS | 2 |
| PD#2<br>LOS | 3 |
| PC#1<br>LOS | 4 |
| TPA#2<br>SSF | 5 |
| TPC#2<br>SSF | 6 |
| PF#1<br>LOS | 7 |
| PE#2<br>LOS | 8 |

FIG 4

| Source Object | Source Alarm | Destination Object | Destination Alarm | Propagation |
|---|---|---|---|---|
| Card | CardDisabled | NE | IntHWFail | NEAR |
| Card | CardDisabled | Port | LOS | NEXT |
| Card | CardDisabled | CTP | SSF | NEAR |
| Port | LOS | CTP | SSF | NEAR |
| Port | LOS | Port | LOS | NEXT |

FIG 5

| Object/Alarm Pair | Sibling Vector |
|---|---|
| NE A<br>IntHWFail | 0 |
| Card A<br>CardDisabled | 0, 1, 2, 5 |
| PB#1<br>LOS | 2 |
| PD#2<br>LOS | 3, 4, 6 |
| PC#1<br>LOS | 3, 4, 6 |
| TPA#2<br>SSF | 5 |
| TPC#2<br>SSF | 6 |
| PF#1<br>LOS | 7, 8 |
| PE#2<br>LOS | 7, 8 |

FIG 6

| Object/Alarm Pair | Sibling Vector |
|---|---|
| Card A CardDisabled | 0, 1, 2, 5 | ← Trouble ticket one
| PD#2 LOS | 3, 4, 6 |
| PC#1 LOS | 3, 4, 6 | ← Trouble ticket two
| PE#2 LOS | 7, 8 |
| PF#1 LOS | 7, 8 | ← Trouble ticket three

FIG 7

| Object/Alarm Pair | Sibling Vector |
|---|---|
| Card A CardDisabled | 0, 1, 2, 5 | ← Trouble ticket candidate one
| PD#2 LOS | 3, 4, 6 | ← Trouble ticket candidate two
| PC#1 LOS | 3, 4, 6 | ← Trouble ticket candidate three
| PE#2 LOS | 7, 8 | ← Trouble ticket candidate four
| PF#1 LOS | 7, 8 | ← Trouble ticket candidate five

METHOD AND APPARATUS FOR IDENTIFYING FAULTS IN A NETWORK THAT HAS GENERATED A PLURALITY OF FAULT ALARMS

CROSS REFERENCE TO RELATED APPLICATIONS

This application claims priority to the British application No. 0322846.7 GB, filed Sep. 30, 2003 and which is incorporated by reference herein in its entirety.

FIELD OF THE INVENTION

The present invention relates to an alarm correlation and root cause analyser for use in complex systems such as communication networks. The invention finds particular application in optical transport networks incorporating Synchronous Digital Hierarchy (SDH) and Dense Wavelength Division Multiplexing (DWDM) technology.

BACKGROUND OF THE INVENTION

There is no optimal solution for the problem of alarm correlation and problem root cause analysis that has been developed towards for optical transport networks that utilise SDH and DWDM. The approaches that have been proposed towards solving this problem seem best tailored for other application domains, like IP based networks, for example, or are generic from an architectural perspective, lacking the means to introduce architectural components that support specific behaviour of some equipment types.

In U.S. Pat. No. 5,528,516 there is described an apparatus and method for determining the root cause (i.e. the source) of a problem in a complex system such as a computer network. The problem identification process described in this document is split into two separate activities of (1) generating efficient codes for problem identification and (2) decoding the problems at run time. A causality matrix is created which relates observable symptoms to likely problems in the system. This causality matrix is reduced into a minimal codebook by eliminating unnecessary information. Observable symptoms are monitored and problems decoded by comparing the observable symptoms against the minimal codebook using best-fit approaches. A Hamming distance measure between symptoms and codes in the codebook is defined and the set of reference symptoms that is closest to the observed symptoms, is selected, and the problem associated with this symptom set is proposed as being the probable cause of the actual observed symptoms.

This approach is not very flexible when it is necessary to deal with multiple simultaneous problems. In this case, there may be coincidence of symptoms from different problems, which will overlap. A more elaborated algorithm than a distance measure might be needed in this case.

This approach does not deal with simultaneous failures and as such it would not deal with the example presented below.

In WO 02/33980 there is described a topology based reasoning apparatus for root cause analysis of network faults. A root cause analysis system operates in conjunction with a fault management apparatus. The system includes a topology based reasoning system operative to topologically analyse alarms in order to identify root cause of the alarms. The system is based on topological network information and fault propagation rules. The topology is translated to a graph onto which incoming alarms and expected alarm behaviour are coordinated. The system's operator must provide the rules.

In this approach, the root cause decision is based on three parameters: 1) the distance in the network of the suspected root cause and the point of origin of each alarm generated by it, 2) the number of alarms in the incoming group that are explained by that root cause and 3) the number of alarms out of all alarms that the system expects for that root cause. When the root cause can not be pinpointed solely on the basis of the rules an expert system is used.

It is not straight forward to use this approach in complex networks such as SDH/DWDM networks, which have a high number of layers and vendor specific idiosyncrasies of equipment types. This is because the operator must define the fault propagation rule set and this is a difficult task when dealing with complex networks. Only occasionally do network operators have all the necessary know how to accomplish this.

Furthermore, using such a distance criteria may not be the best for a network which is modelled as a layered network, like an SDH/DWDM network, because alarms propagate transparently across lower layers.

U.S. Pat. No. 5,946,373 describes a topology based fault analysis system for use in telecommunications networks. The system correlates alarms and infers the root cause of a problem based on the topological configuration of the network. The U.S. Pat. No. 5,946,373 system uses truth tables or a rule-based inference engine or a combination of both for this purpose. This approach has potential problems. The rules and truth tables must be made mutually exclusive so that only one will be found to be true. The truth tables and rules must also be designed in such a way that changing one of their entries does not require changing another. Therefore, this apparatus requires that the rules and/or truth tables be ordered in a "most significant" result fashion. That is, conditions that are considered to be the most important are analysed first, leaving the lesser important faults for a later analysis should one be required. This is a cumbersome approach because it involves a judgement of which problems are the most important. The addition of new rules or truth tables may also lead to a reordering of the results. In effect, the operator is required to know which rules makeup the system and their level of importance in order to take advantage of the system.

None of the systems described in the prior art is particularly suitable for supporting a layered transport network, like an SDH network.

SUMMARY OF THE INVENTION

The present invention aims to alleviate the above mentioned problems.

According to the present invention, there is provided a method for identifying faults in a network that has generated a plurality of fault alarms, the method comprising: generating a plurality of object/alarm pairs, each pair comprising a respective one of the fault alarms and a respective network object responsible for that fault alarm; assigning a respective identification vector to each respective object/alarm pair of the plurality of object alarm pairs; processing the plurality of object/alarm pairs in dependence upon a set of network fault alarm propagation rules to generate for each respective object/alarm pair an alarm propagation vector that identifies that object/alarm pair together with any other object/alarm pairs from the plurality of object/alarm pairs whose alarm may potentially have arisen as a result of that object/alarm pair; processing the plurality of alarm propagation vectors to determine which object/alarm pairs have alarm propagation vectors that are not sub vectors of any of the alarm propagation vectors of the other object/alarm pairs; and identifying any object/alarm pairs thus determined as being linked to potential root causes of network problems.

According to the invention there is provided An apparatus for identifying faults in a network that has generated a plurality of fault alarms, the method comprising: means for generating a plurality of object/alarm pairs, each pair comprising a respective one of the fault alarms and a respective network object responsible for that fault alarm; means for assigning a respective identification vector to each respective object/alarm pair of the plurality of object alarm pairs; means for processing the plurality of object/alarm pairs in dependence upon a set of network fault alarm propagation rules to generate for each respective object/alarm pair an alarm propagation vector that identifies that object/alarm pair together with any other object/alarm pairs from the plurality of object/alarm pairs whose alarm may potentially have arisen as a result of that object/alarm pair; means for processing the plurality of alarm propagation vectors to determine which object/alarm pairs have alarm propagation vectors that are not sub vectors of any of the alarm propagation vectors of the other object/alarm pairs; and means for identifying any object/alarm pairs thus determined as being linked to potential root causes of network problems.

Advantageously, embodiments of the invention are able to separate alarms derived from simultaneous and possibly overlapping failures and thus able to deal with multiple failures. Further features and advantages of the invention will become clear from the following description, which describes an embodiment of the invention, by way of example only, with reference to the accompanying drawings, wherein:

DETAILED DESCRIPTION OF THE INVENTION

Embodiments of the present invention provide improved network fault management by treating the network as a layered network. Network dependencies are taken as being between logical objects as well as between physical objects. Each physical object, for example, a physical port is built from several logical objects, each implementing a specific layer. This approach makes it possible to support other networks based on new technologies, e.g. ATM, that will act as either a client or server for networks based on SDH/DWDM.

A specific embodiment of the invention relates to an optical transport network incorporating both SDH and DWDM and uses specific knowledge from the optical transport networks area, in terms of layered network modelling and alarm propagation—as the result of faults in the system or wrong configurations made by the operator.

The modelling of an SDH/DWDM network cannot be done simply in terms of physical objects, as proposed in other approaches, but must also be done in logical terms, as each physical object is made of several logical layers. Embodiments of the present invention take into account that the relations between these layers have an influence on the way the alarms are propagated on the network.

Embodiments of the present invention are able to cope with multiple problems at the SDH and DWDM levels simultaneously, that is, the algorithm used for alarm correlation is able to create different groups of consequent alarms that result from different network problems.

Figure 1:
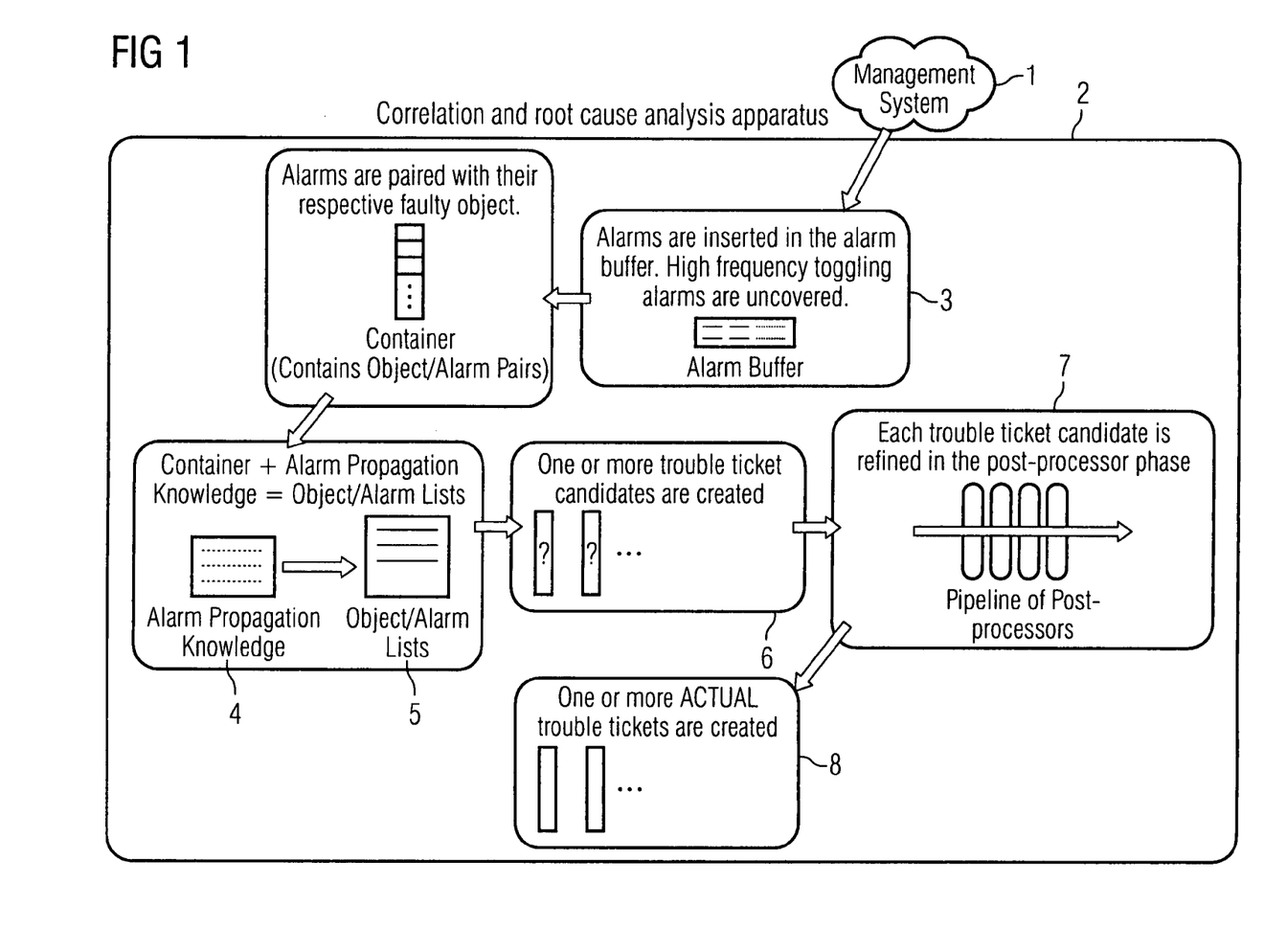
FIG. 1 schematically illustrates the processing steps involved in an embodiment of the invention.

As is schematically illustrated in FIG. 1, in an embodiment of the present invention, when a fault or faults occurs within a managed network (not shown), a network management system 1 notifies an alarm correlation and root problem apparatus 2 by way of various alarms. The alarms are stored within a buffer 3 of the apparatus 2 for a user-specified period of time. Following the expiration of the timer, the apparatus 2 maps each alarm to its respective network object, i.e., the problematic network object for which a given alarm was raised.

The apparatus 2 contains a pre-defined knowledge base of network alarm propagation 4, which is used to generate an object/alarm list 5. This object/alarm list 5 is in turn processed to create one or more trouble ticket candidates 6, each of which identifies a network object or objects that is potentially the root cause of a network fault.

The layered modelling of the network by itself may not be enough to allow the detection of some types of problems, for example configuration problems, since these depend on some state information being stored. As such, the groups of alarms obtained from the correlation phase may have to be regrouped. This is done with an architecture that is based on a pipeline of post-processors 7, each analysing the alarm groups together with some external information and to regroup them accordingly.

This architecture also supports the creation of post-processors for dealing with specific characteristics of certain types of equipment. These post-processors are designed so as to make them available on demand, i.e., each post-processor can be inserted into the apparatus at any time without requiring it be turned off; likewise, any post-processor may be removed from the apparatus in a similar fashion.

Ideally, each post-processor provides one specific function such as locating a particular equipment failure type or configuration fault. As the trouble ticket candidates are piped from one post-processor to the next, the trouble ticket candidates are gradually enhanced, culminating with the generation of actual trouble tickets 8, one for each fault in the network, which details the root cause of that fault.

Such an approach provides for alarm correlation and root cause analysis for a broad spectrum of potential network problems in SDH/DWDM networks.

Moreover, the concept of using a pipeline of post-processors allows the support of equipment specific issues. The pipeline may be implemented in such a way that allows for new stages to be added to it in runtime, without taking the system out of operation.

A specific example of an embodiment of the invention will now be described with reference to FIG. 2, which illustrates a data network 10 that encompasses two technologies, namely, DWDM and SDH.

The network 10 comprises a plurality of network elements A to F. Network elements A and C are multiplexers with STM 1 interfaces and VC 12 terminations. The network elements B and D are SDH multiplexers with STM 16 and STM 1 interfaces. The network elements E and F are DWDM equipment such as the Waveline MN.

Each of the network elements A to F comprises a pair of physical ports, labelled PA#1 and PA#2 for element A, PB#1 and PB#2 for element B, PC#1 and PC#2 for element C, PD#1 and PD#2 for element D, PE#1 and PE#2 for element E and PF#1 and PF#2 for element F. Each of these physical ports is an end point of a physical channel in the network, for example, a fibre.

Each of the network elements A to F further comprises a pair of termination points, labelled TPA#1 and TPA#2 for element A, TPB#1 and TPB#2 for element B, TPC#1 and TPC#2 for element C, TPD#1 and TPD#2 for element D, TPE#1 and TPE#2 for element E, and TPF#1 and TPF#2 for element F.

Each of these termination points is an end point of a logical channel (as opposed to a physical channel) and they are used internally in the network elements to create connections, in order to extract low order signals (tributaries) from high order signals.

Network element A further comprises a network card (Card A).

In this example, the algorithm implemented by the alarm correlation and root apparatus 2 uses information concerning logical and physical relationships between network objects and also information concerning the propagation of rules between layers to infer that three simultaneous network failures have occurred, namely, two fibre breaks and a card failure.

The algorithm is computationally efficient and also permits the detection of multiple simultaneous faults. The algorithm uses bit vectors to manipulate alarms and their respective siblings, a sibling being defined as an alarm that is potentially the result of another alarm. The algorithm determines a bit vector for each of a plurality of object/alarm pairs. Then the algorithm performs, a series of logical 'AND' operations amongst the bit vectors, to eliminate bit vectors of object/alarm pairs that are siblings of other object/alarm pairs.

By eliminating bit vectors associated with object/alarm pairs that are siblings of others, the trouble ticket candidates are produced and from these the actual root cause(s) of networks problem(s) may be deduced.

Figure 2:
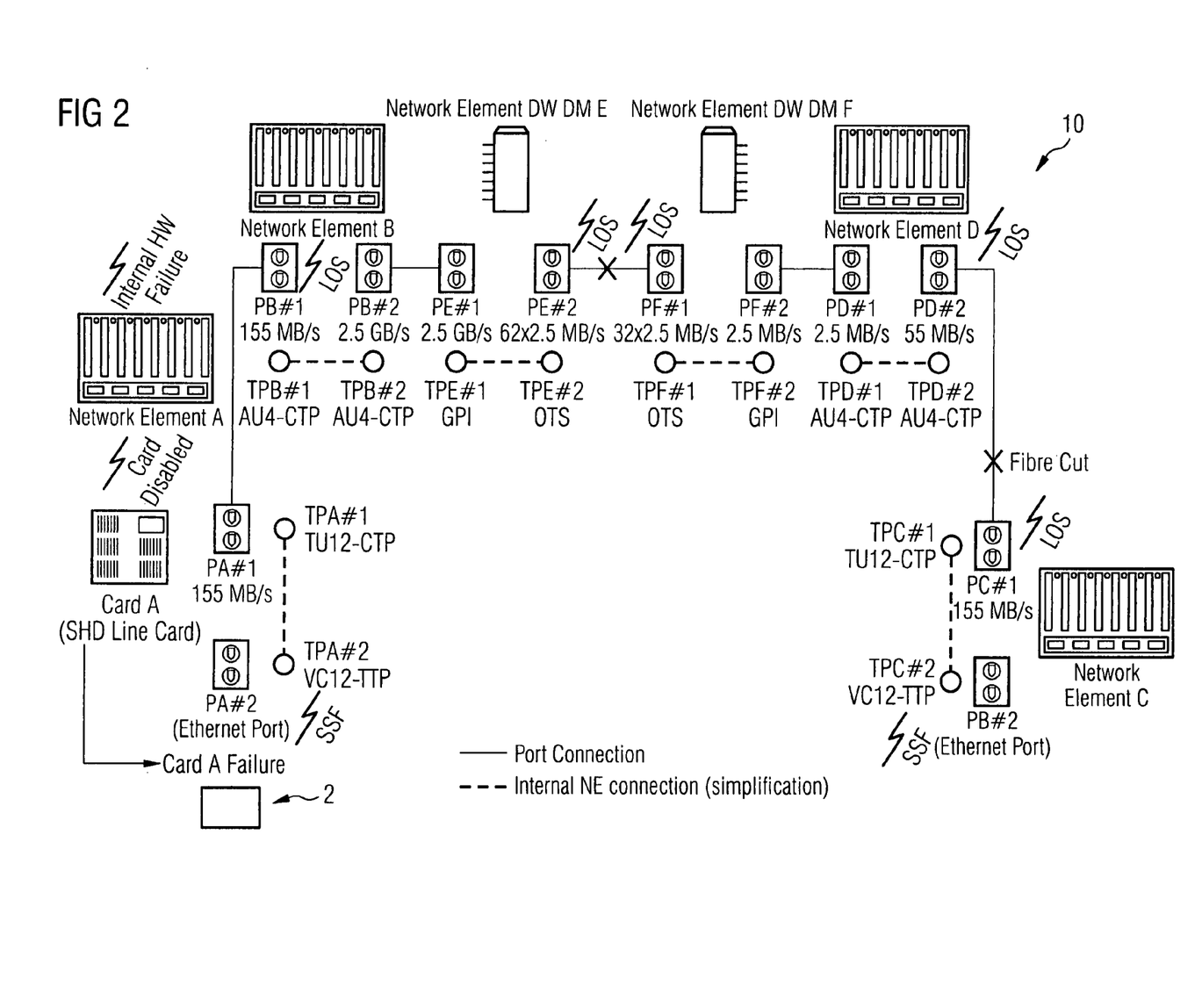
FIG. 2 illustrates a network having three simultaneous failures.

The three simultaneous faults in the network depicted in FIG. 2 are, a failure of the network Card A of the network element A, a fibre cut between the SDH ports PD#2 and PC#1 and a fibre cut between the DWDM ports PE#2 and PF#1.

The card failure generates a CardDisabled alarm at the faulty card, and an Internal Hardware Failure notification is raised against network element A. The failure stops traffic flowing between the ports PA#1 and PB#1 a Loss of Signal alarm LOS is raised at PB#1 because it has stopped receiving the signal. Also, the CardDisabled condition causes a ServerSignalFail(SSF) at the TPA#2.

At the other end of the network, the port connection involving the ports PD#2 and PC#1 is damaged due to a fibre cut. The immediate result of this fault is a Loss of Signal LOS alarm at each of these ports. The LOS condition at PC#1 leads to a Server Signal Fail SSF alarm at the TPC#2.

Finally, a fibre break between the DWDM ports PE#2 and PF#1 causes a Loss of Signal LOS at each port.

It will be appreciated that in a real working network, the above-described failures would cause more secondary alarms to be raised (assuming that they had not been suppressed in management system). They have been omitted from this example for purposes of brevity.

As the alarms are reported to the apparatus 2 by the network manager they are stored in the buffer 3 (not shown in FIG. 2) to allow for checking for possible repetition of alarms and also to amass the alarms so that alarm correlation may be achieved.

This process of adding alarms to the buffer 3 continues until a correlation timer has expired. Subsequently, each gathered alarm is paired with the individual network object associated with the alarm and the pairs are placed in a container.

Figure 3:
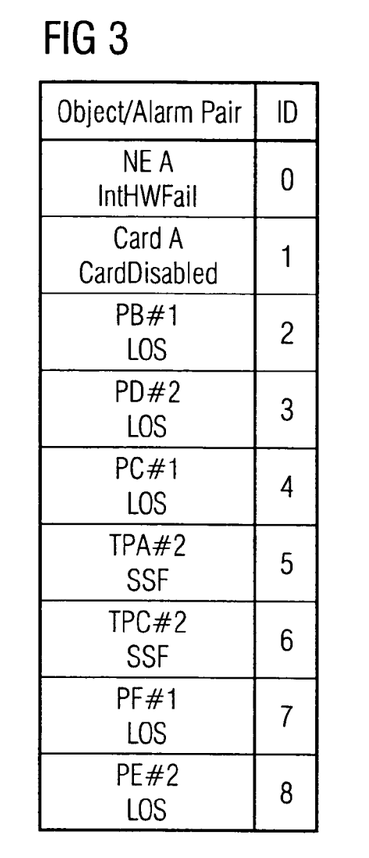
FIG. 3 illustrates a list of object/alarm pairs and assigned identification vectors.

The algorithm then assigns a numeric identifier ID to each object/alarm pair. As is illustrated in FIG. 3, for the nine object/alarm pairs of this example, this may be achieved by assigning in a random fashion to each object/alarm pair, a different one of the numbers between zero to seven. These ID's enable the apparatus to have an efficient handle to each of the object/alarm pairs.

Next, the apparatus creates an object/alarm list. List creation depends upon two sources of information: the object (that make up the container) physical and logical dependencies and on the knowledge base that expresses the way that alarms propagate throughout the network. This knowledge base denotes the relationship between SDH/DWDM alarms, SDH/DWDM equipment alarms and also a mixture of SDH/DWDM and equipment alarms.

Figure 4:
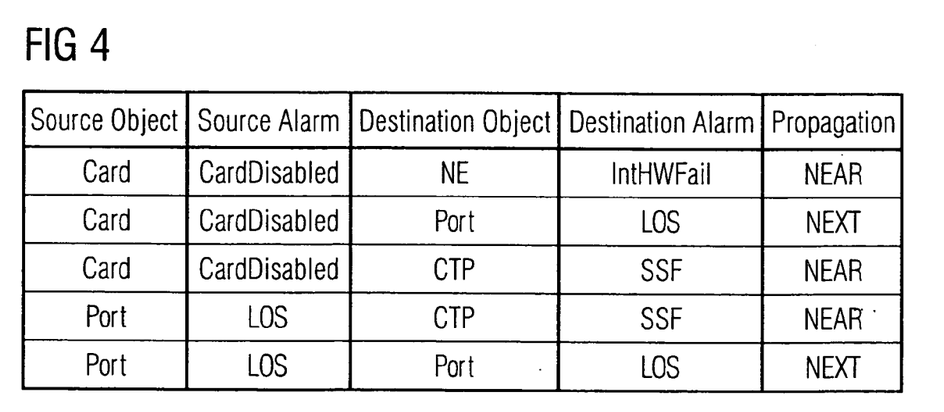
FIG. 4 illustrates alarm propagation rules for the network illustrated in FIG. 2.

The table shown in FIG. 4 outlines the alarm propagation knowledge base required to group the network faults of this example.

Each row in FIG. 4 represents a rule that defines a source object and source alarm as well as a destination object and a destination alarm. The principal is that the source object and source alarm originate the destination alarm in the destination object, thus defining a cause/effect relationship in the process.

The table defines relationships involving physical objects e.g. equipment parts and it also defines relationships involving logical entities.

For example, a fault of a network card (Card) results not only in a 'Card Disabled Alarm' but also in an 'Internal Hardware Failure' in the card's network device (NE). This alarm propagation relationship is one between two physical equipment parts.

A fault at a physical port (Port) results not only in a 'Loss of Signal' alarm at the port but also in a 'Server Signal Fail' at the termination points (CTP), which are logical objects, using the physical port.

A rule also delineates a propagation attribute that indicates how far the source object and source alarm's effects spread throughout the network. This attribute guarantees that no more object/alarm pairs than those that are strictly required are taken into account by the apparatus during the correlation process.

The objects in the table are connected by dependency relations. The 'NEAR' qualifier means that two objects are directly connected. The 'NEXT' qualifier means that two objects are not directly connected but will have another object or objects in between.

By applying the alarm propagation knowledge to the object/alarm pairs, the algorithm generates an object/alarm list, which for each object/alarm pair details a sibling or bit vector, that identifies its own object/alarm pair together with any other object/alarm pairs which may potentially result from that bit vector's own object/alarm pair.

Figure 5:
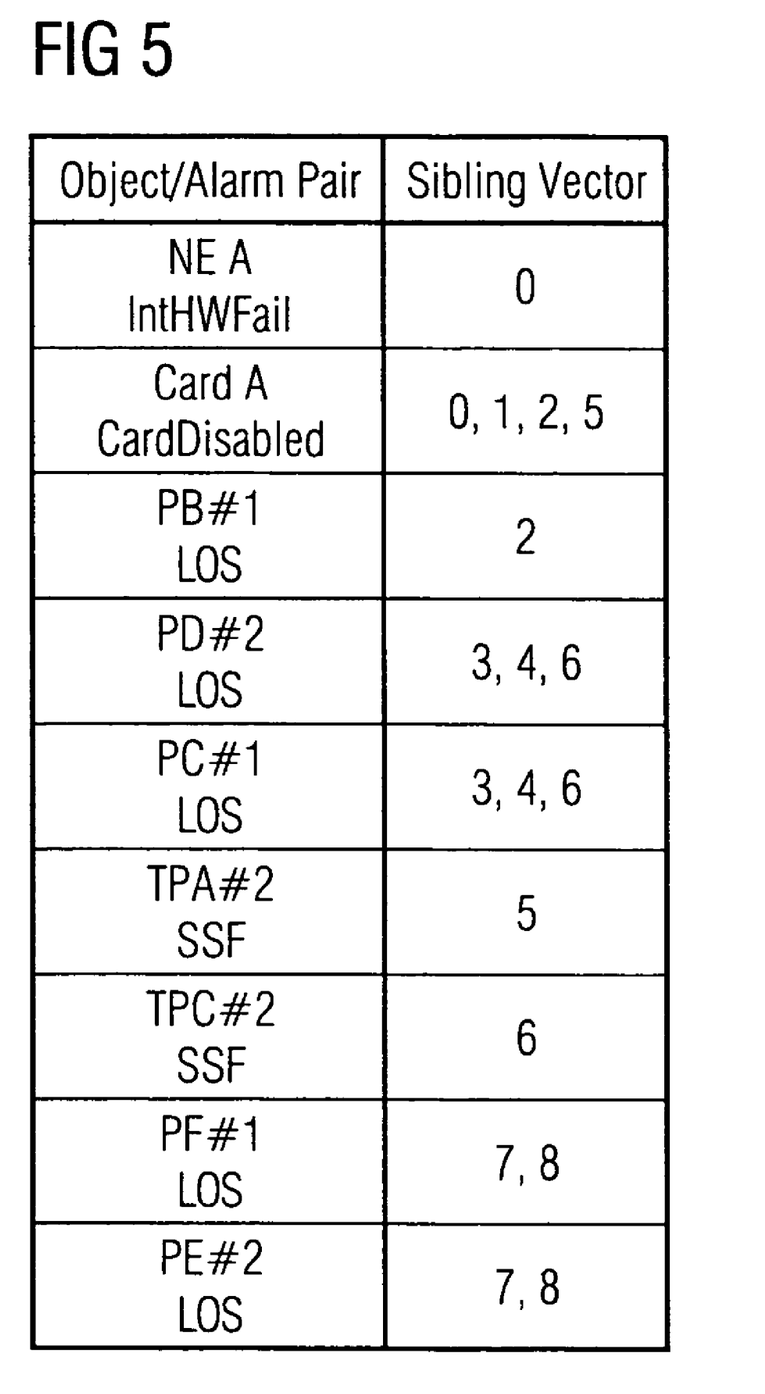
FIG. 5 illustrates a list of object/alarm pairs and associated sibling vectors.

The object alarm/pairs and sibling vectors for this example are illustrated in FIG. 5.

Following the creation of the bit vectors, the apparatus may perform root cause analysis. To this end, the algorithm iterates through each of the object/alarm pairs to find exactly which pairs are responsible for the appearance of other pairs. This is achieved by using logical 'ANDs' to test if the sibling vector of a given object/alarm pair is included in any other object/alarm pair's sibling vector.

Any object/alarm pair whose vector is found to be present in the sibling vector of another object/alarm pair is discarded from any further root cause analysis considerations.

This discarded pair will be included in the trouble ticket (to be emitted) featuring the object/alarm pair whose sibling vector was used to nullify (in terms of root cause analysis) the discarded object/alarm pair.

The algorithm concludes this process when it is no longer possible to discard object/alarm pairs. The remaining, non-nullified pair(s) are deemed to be the cause(s) of any discarded object/alarm pairs.

Figure 6:
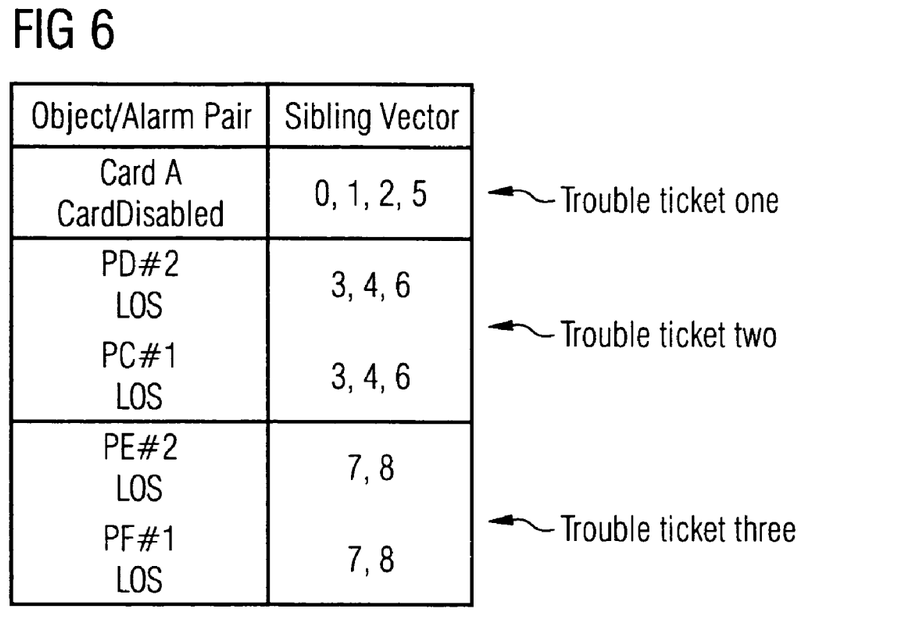
FIG. 6 illustrates five alarm/object pairs identified as potential root causes of network faults.

In this example, the correlation algorithm generates five object/alarm pairs that are possible root causes of the network problems and which are output as trouble ticket candidates. These five pairs are illustrated in FIG. 6.

Five trouble ticket candidates are generated because whereas the correlation algorithm can identify Card A as being a root cause of a problem, it can only identify that either the port PD#2 or the port PC#1 is a root cause of a problem because they have the same bit vector, and it can only identify that either the port PE#2 or the port PF#1 is a root cause of a problem because they have the same bit vector.

Figure 7:
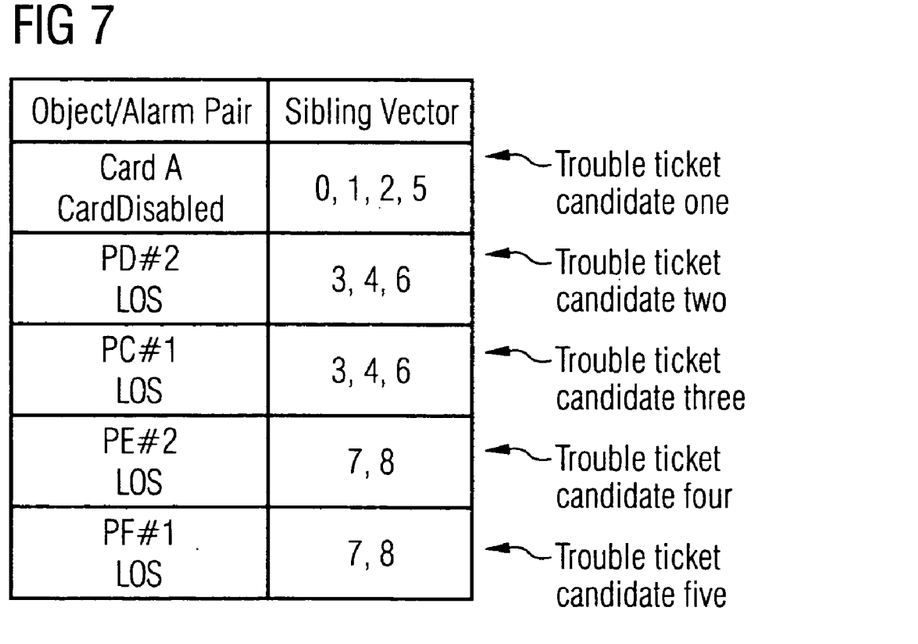
FIG. 7 illustrates three groups of alarm/object pairs identified as root causes of network faults.

Based on this output and stored knowledge that the network configuration is such that the ports PD#2 and PC#1 are connected by a link, and that the ports PE#2 and PF#1 are connected by the link, a post processing stage then generates the three trouble tickets illustrated in FIG. 7, each identifying the root cause of a network failure.

One ticket identifies Card A as being a root cause of a failure, one identifies the object pair of the ports PD#2 and PC#1 as being the root cause of a network failure, and one identifies the object pair of the ports PE#2 and PF#1 as being the root cause of a network failure. The last two mentioned tickets implicitly identify the link connecting the ports PD#2 and PC#1 and the link connecting the ports PE#2 and PF#1 as being the root cause of network failures.

Having thus described the present invention by reference to a preferred embodiment, it is to be well understood that the embodiment in question is exemplary only and that modifications and variations such as will occur to those possessed of appropriate knowledge and skills may be made without departure from the scope of the invention as set forth in the appended claims.

The invention claimed is:

1. A method for identifying faults in a network that has generated a plurality of fault alarms, the method comprising:
 generating a plurality of object/alarm pairs, each pair comprising a respective one of the fault alarms and a respective network object responsible for that fault alarm;
 assigning a respective identification vector to each respective object/alarm pair of the plurality of object alarm pairs;
 processing the plurality of object/alarm pairs in dependence upon a set of network fault alarm propagation rules to generate for each respective object/alarm pair an alarm propagation vector that identifies that object/alarm pair together with any other object/alarm pairs from the plurality of object/alarm pairs whose alarm may potentially have arisen as a result of that object/alarm pair;
 processing the plurality of alarm propagation vectors to determine which object/alarm pairs have alarm propagation vectors that are not sub vectors of any of the alarm propagation vectors of the other object/alarm pairs; and
 identifying any object/alarm pairs thus determined as being linked to potential root causes of network problems.

2. The method according to claim 1, wherein the object/alarm pairs determined as being linked to potential root causes of network problems are processed by a post processor that uses network configuration information to determine that the object/alarm pairs may be placed into a plurality of groups, each group comprising one or more of the object/alarm pairs and each group being associated with a root cause of a network problem.

3. The method according to claim 1, wherein the network objects comprise physical and logical objects.

4. The method according to claim 2, wherein the network objects comprise physical and logical objects.

5. The method according to claim 1, wherein the network is a data network.

6. The method according to claim 2, wherein the network is a data network.

7. The method according to claim 3, wherein the network is a data network.

8. The method according to claim 5, wherein the network is an optical data network.

9. The method according to claim 8, wherein the network comprises SDH and DWDM technology.

10. The method according to claim 1, wherein the method is performed by a computer program.

11. The method according to claim 10, wherein the computer program runs on a computing device adapted to perform the method.

12. A computing device adapted to perform a method for identifying faults in a network that has generated a plurality of fault alarms, the method comprising:
 generating a plurality of object/alarm pairs, each pair comprising a respective one of the fault alarms and a respective network object responsible for that fault alarm;
 assigning a respective identification vector to each respective object/alarm pair of the plurality of object alarm pairs;
 processing the plurality of object/alarm pairs in dependence upon a set of network fault alarm propagation rules to generate for each respective object/alarm pair an alarm propagation vector that identifies that object/alarm pair together with any other object/alarm pairs from the plurality of object/alarm pairs whose alarm may potentially have arisen as a result of that object/alarm pair;
 processing the plurality of alarm propagation vectors to determine which object/alarm pairs have alarm propagation vectors that are not sub vectors of any of the alarm propagation vectors of the other object/alarm pairs; and identifying any object/alarm pairs thus determined as being linked to potential root causes of network problems.

13. An apparatus for identifying faults in a network that has generated a plurality of fault alarms, the apparatus comprising:

a mechanism for generating a plurality of object/alarm pairs, each pair comprising a respective one of the fault alarms and a respective network object responsible for that fault alarm;

a mechanism for assigning a respective identification vector to each respective object/alarm pair of the plurality of object alarm pairs;

a mechanism for processing the plurality of object/alarm pairs in dependence upon a set of network fault alarm propagation rules to generate for each respective object/alarm pair an alarm propagation vector that identifies that object/alarm pair together with any other object/alarm pairs from the plurality of object/alarm pairs whose alarm may potentially have arisen as a result of that object/alarm pair;

a mechanism for processing the plurality of alarm propagation vectors to determine which object/alarm pairs have alarm propagation vectors that are not sub vectors of any of the alarm propagation vectors of the other object/alarm pairs; and a mechanism for identifying any object/alarm pairs thus determined as being linked to potential root causes of network problems.

* * * * *